United States Patent [19]

Cremens et al.

[11] Patent Number: 5,039,371
[45] Date of Patent: Aug. 13, 1991

[54] APPARATUS FOR ROLL-CONSOLIDATION OF THERMOPLASTIC COMPOSITE LAMINATES

[75] Inventors: Walter S. Cremens, Atlanta; Emilio Ferrer, Clarkston, both of Ga.

[73] Assignee: Lockheed Corporation, Calabasas, Calif.

[21] Appl. No.: 327,634

[22] Filed: Mar. 23, 1989

[51] Int. Cl.⁵ .............................................. B32B 31/20
[52] U.S. Cl. ................................... 156/382; 156/285; 156/286; 156/583.1; 264/511; 264/102; 425/388
[58] Field of Search ................. 156/382, 286, 285, 87, 156/104; 264/510, 511, 102; 425/DIG. 19, 388; 219/464

[56] References Cited

U.S. PATENT DOCUMENTS

| | | | |
|---|---|---|---|
| 2,290,548 | 7/1942 | Galber | 156/212 X |
| 3,493,451 | 2/1970 | Beery | 156/382 |
| 3,703,422 | 11/1972 | Yoshino | 156/285 |
| 3,789,189 | 1/1974 | Fischer et al. | 219/464 |
| 4,000,559 | 12/1988 | Brown | 264/510 |
| 4,505,771 | 3/1985 | George | 156/286 |
| 4,629,527 | 12/1986 | Livi et al. | 156/285 |
| 4,714,511 | 12/1987 | Nakao | 156/285 |
| 4,731,151 | 3/1988 | Kaller et al. | 156/382 |

Primary Examiner—Michael W. Ball
Assistant Examiner—Michele K. Yoder
Attorney, Agent, or Firm—Robert P. Barton

[57] ABSTRACT

An apparatus for consolidating sheets (13) of continuous graphite fiber in a thermoplastic matrix resin uses a roller (10) in conjunction with a heating surface (16) and a vacuum bag (12). A tack-welded stack of composite sheets (13) or prepreg is assembled onto a frame support structure (27) and placed into the vacuum bag (12) as an assembly (28) which is placed on a heated surface (16) whereby its temperature is elevated above the melting point of the matrix resin in the composite sheets (13). The roller (10) rolls over the bag (12) with the sheets (13) therein whereby any remaining air and gas between the sheets (13) is forced out ahead of the roller (10). After the roller (10) has passed, atmospheric pressure on the vacuum bag (12) is sufficient to prevent spontaneous delamination of the hot laminated panel formed by the sheets (13). The assembly (28) may then be moved to a cooling table (26) to complete the laminate consolidation process.

9 Claims, 6 Drawing Sheets

APPARATUS FOR ROLL-CONSOLIDATION OF THERMOPLASTIC COMPOSITE LAMINATES

TECHNICAL FIELD

This invention relates to the art of consolidating a stack of sheets or plies of thermoplastic material and more particularly to such art wherein each sheet of the stack is comprised of aligned continuous graphite fibers preimpregnated with a thermoplastic matrix resin.

BACKGROUND OF THE INVENTION

In the past consolidation of thermoplastic sheets into solid, substantially flat panels of useful thicknesses for use as structural panels and the like has been achieved inside heated autoclaves under pressure or on heated platen presses. Such panels are useful in the aircraft industry because they have strength and weight characteristics superior to aluminum and at the same time can be machined by longstanding methods applicable to aluminum which has been used extensively in the manufacture of aircraft.

The autoclave process is slow and inefficient in its use of energy. The sheets are required to be confined for several hours in the sealed environment of the autoclave where monitoring of the process is difficult. Not only is this process of placement of the multiple, stacked sheets in the autoclave time-consuming, but if there is poor bonding or some mistake in the process, it is not discovered for hours, after removal of the sheets from the autoclave. As a result there is a loss of the investment in autoclave time, manpower and auxiliary materials.

As for laminated panels formed on a press, the platen size limits the size of panels which can be produced. Internal dimensions of autoclaves also limit the size of panels which can be produced in them. When large (for example, 24 feet by 8 feet) single panels are required, as for aircraft wing skins, acquisition costs for presses as well as for autoclaves can be prohibitive.

The foregoing deficiencies of the current practices leave much to be desired in filling the needs of high productivity and automation, especially in the aircraft industry. Because of the ever-growing use of thermoplastic panels in structural applications to airplane manufacture, a faster, less expensive and more reliable and efficient means for forming these panels especially in large sizes has become important.

BACKGROUND ART

The present state-of-the-art in the technology area of the instant invention is revealed in the following U.S. Pat. Nos.: Berry U.S. Pat. No. 3,493,451 (issued on Feb. 3, 1970); Maus U.S. Pat. No. 3,553,054 (issued on Jan. 5, 1971); Yoshino U.S. Pat. No. 3,703,422 (issued on Nov. 21, 1972); Shumaker U.S. Pat. No. 3,933,552 (issued on Jan. 20, 1976); Turner U.S. Pat. No. 3,970,502 (issued on July 20, 1976); Dickerson U.S. Pat. No. 4,065,340 (issued on Dec. 27, 1977); Krueger U.S. Pat. No. 4,078,962 (issued on Mar. 14, 1978); Stoltze et al. U.S. Pat. No. 4,217,157 (issued on Aug. 12, 1980); Revill et al. U.S. Pat. No. 4,290,838 (issued on Sept. 22, 1981); Armini et al. U.S. Pat. No. 4,421,589 (issued on Dec. 20, 1983); Sarh et al. U.S. Pat. No. 4,512,837 (issued on Apr. 23, 1985); Johnson et al. U.S. Pat. No. 4,562,033 (issued on Dec. 31, 1985); Letterman U.S. Pat. No. 4,622,091 (issued on Nov. 11, 1986); Brozovic et al. U.S. Pat. No. 4,681,651 (issued on July 21, 1987).

Of the foregoing Shumaker and Berry are considered to be most pertinent with respect to the invention herein proposed. These prior art disclosures and combinations, however, fall far short of satisfying the needs for which the present invention is presented for reasons to become more apparent.

DISCLOSURE OF INVENTION

In accordance with the teachings of the present invention an apparatus is provided which will consolidate a plurality of preimpregnated sheets of a thermoplastic composite into a single, solid, panel without the use of autoclaves or heated platen presses. To this end the apparatus herein proposed is designed and adapted to accommodate the following procedure:

Step 1. LAYUP AND TACKING

Sheets of preimpregnated thermoplastic composite or prepreg are "tacked" (hot-tack-welded) into layers with the unidirectional (fiber length) directions in each layer disposed or angled as desired. The relative angles of the various layers are determined according to well-known formulae for determining the strength and elastic moduli of the final laminate or panel. The tacking process may be accomplished by any one of various methods which produce a pattern of local tack welds. Tacking may be done manually with a hot tacking iron which is something like a soldering iron flattened on one side or it may be done with an ultrasonic welder. The result of the layup and tacking process is a still-unconsolidated but handleable stack of prepreg sheets or plies. About twenty percent or more of the volume of such a stack is accounted for by air-filled spaces between the prepreg plies. While the method of layup and tacking described are well known to those skilled in the art they are a precursor step to the use of this invention and per se are not part of this invention.

Step 2. CONSOLIDATION UNDER THE SIMULTANEOUS INFLUENCES OF HEAT AND PRESSURE

The objectives of this processing step are 1) to drive out the air from the spaces between plies, 2) to remelt the matrix resin, and 3) to press the plies together so closely that they become welded to one another. These are purely thermomechanical processes. There is no need for a time-consuming cure cycle, as is required for thermoset matrix resins, such as epoxy, where chemical changes take place in the resin. On the contrary, the thermoplastic resin needs only to be melted and put under sufficient pressure, but in such a manner that all of the air in the stack of plies and any adsorbed surface gases are removed. This latter is accomplished in the roll-consolidation process by a combination of vacuum de-aeration and the "squeegee" effect of the roller.

Step 3. COOLING THE CONSOLIDATED LAMINATE UNDER PRESSURE UNTIL THE MATRIX RESIN IS WELL BELOW ITS SOLIDIFICATION TEMPERATURE This is necessary because the laminate will spontaneously delaminate if pressure is removed while the matrix resin is still molten or even if it is solidified but not cooled down sufficiently to resist the forces of spontaneous delamination. For example, for a graphite fiber in a thermoplastic matrix resin, such as PolyEtherEtherKetone (PEEK) laminate consolidated in a platen-press, it is recommended to keep full pressure on until the laminate has cooled below 400° F. With PEEK, there is an additional complication that a fast cooling rate from the molten state is desirable in order to develop the optimum fine-grained microstructure in the matrix resin.

Thus far we have primarily been addressing consolidation of a flat laminate. The resulting consolidated flat laminate may either be a final product form, comparable to a standard sheet of aluminum metal or it may be shaped by various methods and tools known to the metal-forming art. Such further forming, however, lies outside the limits of this discussion of the consolidation process.

The apparatus essentially comprises a heated flat surface upon which a vacuum-bagged stack of preimpregnated sheets of thermoplastic composite is placed. A vacuum source, connected to the bag, withdraws the air from it. The composite material is heated to a temperature above the melting point of its thermoplastic matrix resin by contact with the heated surface. A single massive roller is rolled along the surface, like a rolling pin, to consolidate the composite sheets into a single solid laminated panel. If desired, several passes of the roller may be made to insure total compaction of the sheets and complete consolidation.

By maintaining vacuum pressure in the vacuum bag after the roller has passed, spontaneous delamination is prevented while the resin is still molten. Removal of heat from the still vacuum-bagged laminate allows the desired cooling and solidification of the resin. This may be accelerated by placing the vacuum bag and contents in a low temperature (e.g. room temperature) environment. An optimum chill rate for microstructural control of the matrix resin is thereby possible. At the same time, the heated bed and roller mechanism is released and may be made ready for the next unit. To this end a moveable frame or carrier is employed in conjunction with the vacuum bag.

BRIEF DESCRIPTION OF THE DRAWINGS

With the above and other objects in view as will be apparent, this invention consists in the construction, combination and arrangement of parts all as herein-above more fully described, claimed and illustrated in the accompanying drawings wherein:

DETAILED DESCRIPTION AND STRUCTURE OF A PREFERRED EMBODIMENT

Figure 1:
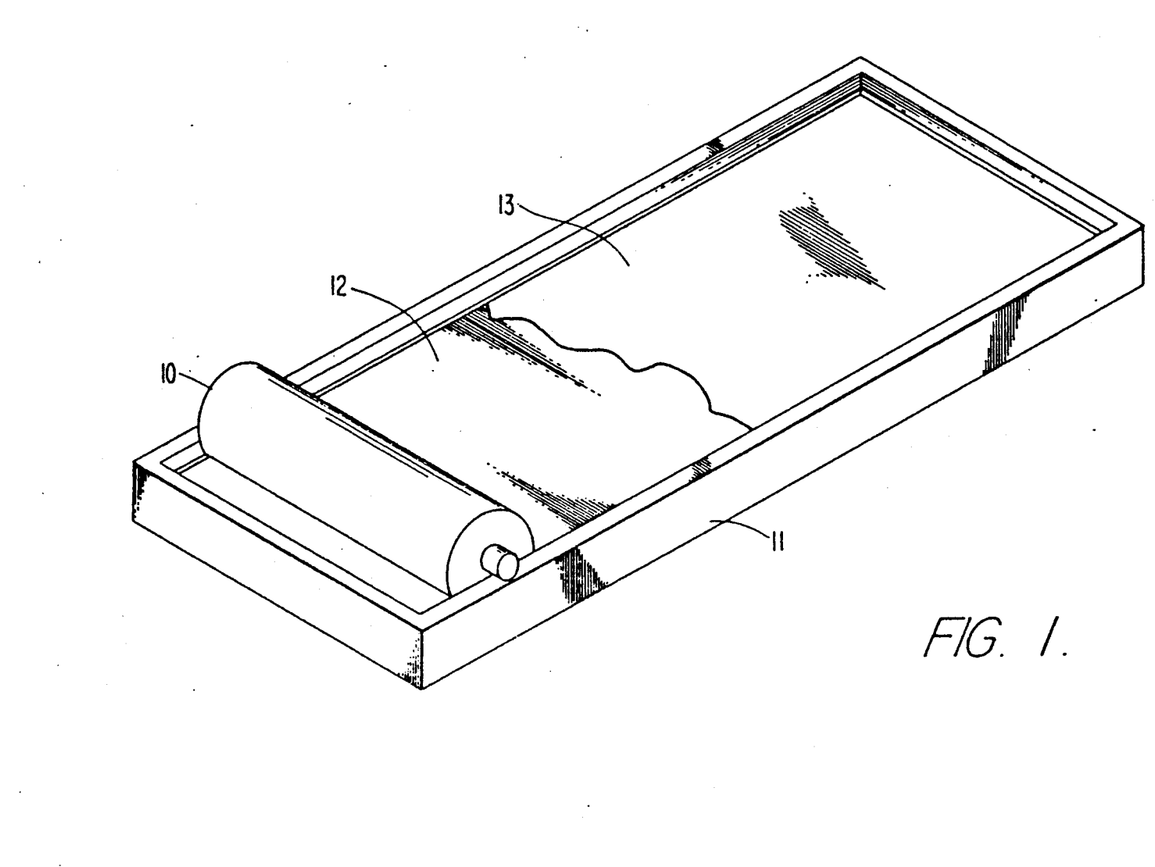
FIG. 1 is a conceptual illustration showing essential elements of the invention.

Referring more particularly to the drawings, FIG. 1 shows the essential elements of the apparatus which are: a roller 10 resting upon a heated flat bed 11; a vacuum bag 12, containing a plurality of stacked sheets 13 of preimpregnated thermoplastic composite material, which is disposed on the flat bed 11. Heating devices 14 (FIG. 3) in the bed 11 underneath the stacked sheets 13 enable the heating thereof so that as the roller 10 is moved from one end of the heated bed 11 to the other, the several sheets 13 are forced together by the weight of the roller 10. After rolling, atmospheric pressure upon the vacuum bag 12 is maintained until the composite sheets 13 cool.

Figure 2:
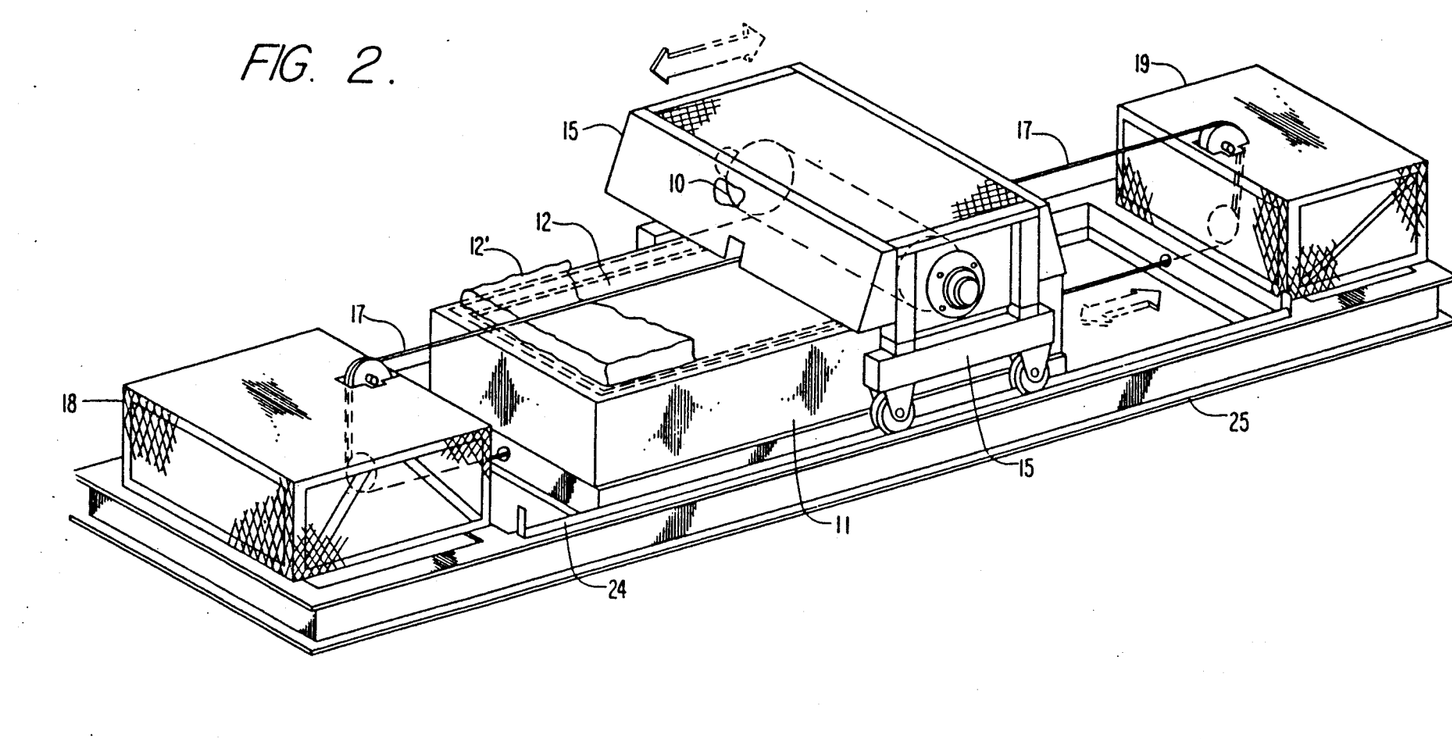
FIG. 2 is an isometric of an apparatus constructed in accordance with the teachings of this invention to show constructive details of a preferred embodiment thereof.

In FIG. 2 the roller 10 is shown mounted in a roller gantry 15 which rolls on a track 24. The gantry 15 ether holds the roller 10 out of contact with the flat heated surface 16 of the bed 11 or allows it to fall upon the bed 11. The roller 10 applies the pressure of its weight and the weight of the gantry 15 to the vacuum bag 12, which surrounds the composite sheets 13.

A heavy steel roller-link chain 17 is attached, as by weld, bolt or any equivalent, fore and aft to the roller gantry 15. The chain 17 runs in a loop both above and below the flat bed 11 and passes through both a motor station 18 preferably electrically powered and a gear end station 19. The gear end station 19 takes up slack in the chain 17 and acts as an unpowered pulley end.

An insulation blanket 12' is disposed upon the vacuum bag 12, while the composite sheets are being heated. The blanket 12' is removed just prior to rolling. The roller 10 is then rolled along the length of the flat bed 11 applying its entire weight plus the weight of the gantry 15 onto the heated composite sheets 13. The pressure of the roller 10 assures 100% intimate contact between the sheets 13. At the same time the roller 10 by its squeegee action pushes any remaining gases out in front of the roller 10. After the roller 10 has passed over the bagged sheets 13, atmospheric pressure upon the vacuum bag 12 is sufficient to prevent spontaneous delamination.

Figure 3:
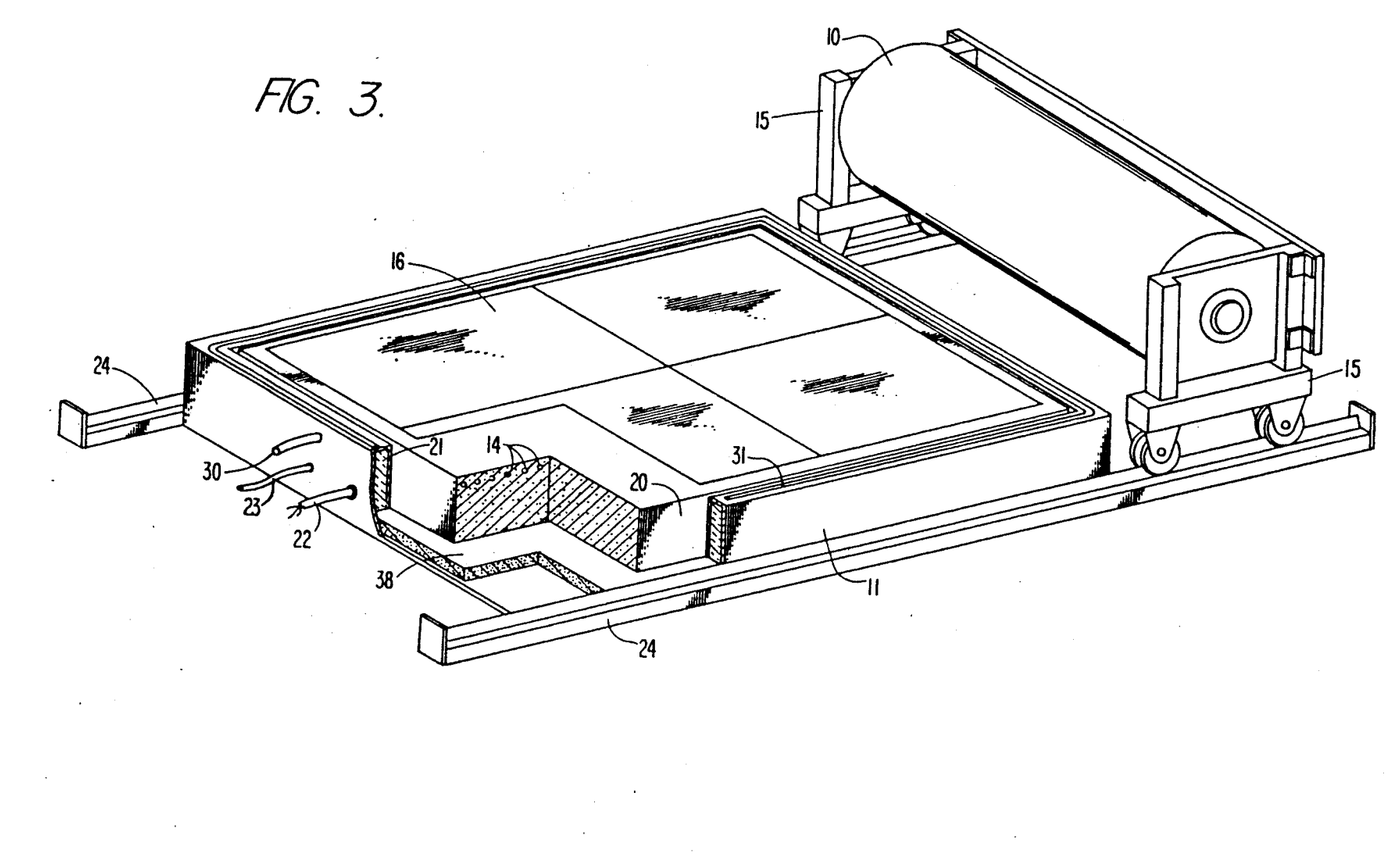
FIG. 3 is an isometric view of the flat heated surface and roller mechanism with parts broken away to show the construction thereof.

FIG. 3 shows the details of the flat bed 11 which contains the heated platen surface 16. The bed 11 preferably consists of a steel box which contains an electrically heated ceramic block 20 from which it is insulated as at 21. The heating device 14 comprises coils of heater wire, which are filled into molded cylindrical holes in the bed 11. Electrical power is thereby fed to the block 20 through leads 22, and temperature of the heated surface 16 is measured by means of a thermocouple 23. Gantry tracks 24 as well as the motor station 18 and gear end station 19 are fastened to a support structure 25 (FIG. 2). The support structure 25 consists of a multi-bay rectangle of steel channels.

Figures 4A, 4B, 4C:
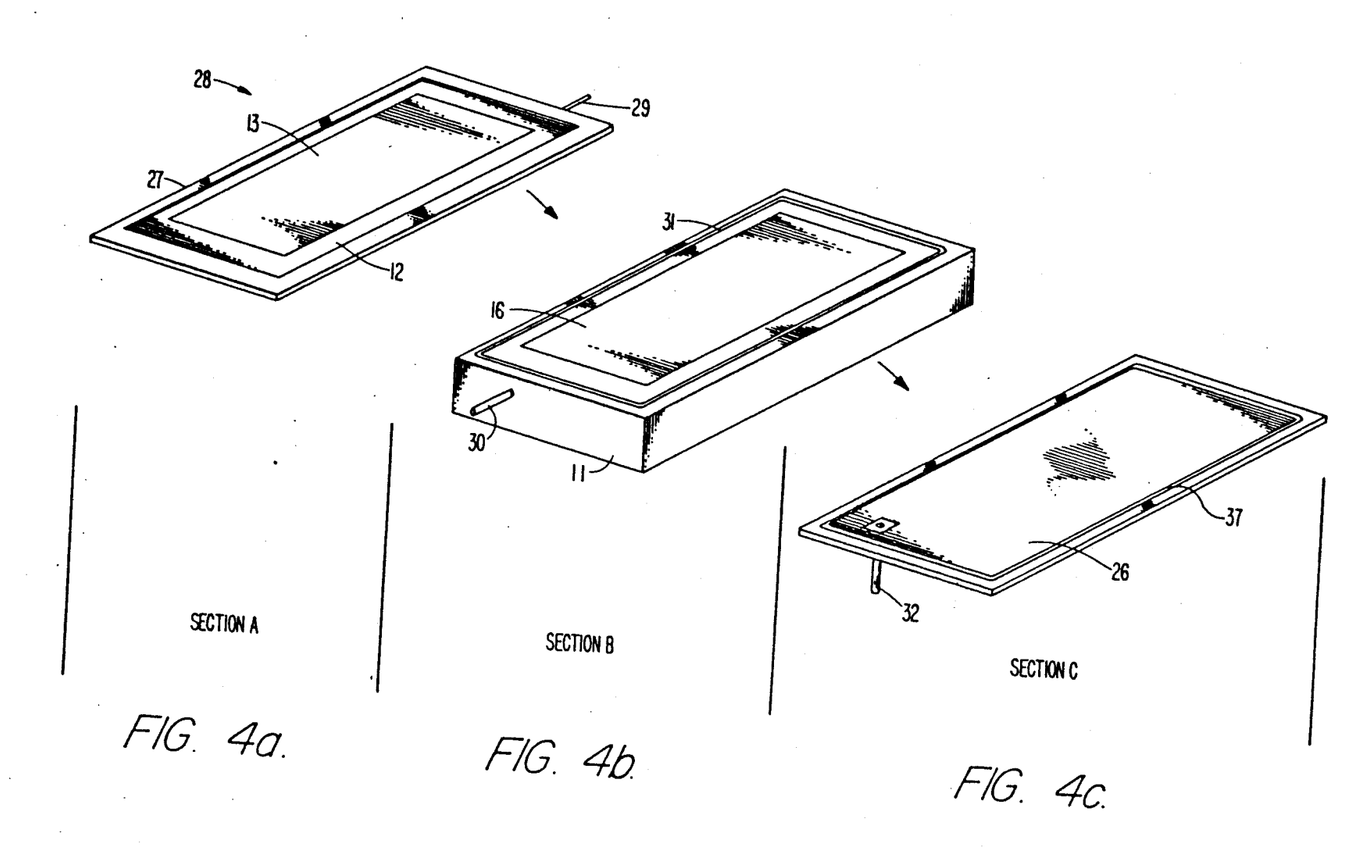
FIG. 4 is an isometric view to show the process flow for consolidating the thermoplastic composite panels.

In FIG. 4, Section A represents the layup, tacking and packaging for the composite material, i.e., the sheets 13, while Section B shows the assembly comprising the flat bed 11 and Section C shows a cooling table 26. Altogether FIG. 4 shows how a frame carrier 27 is used to transport the composite sheets 13 from a layup and assembly station to the flat bed 11 and later to the cooling table 26. Thus, the three Section A, B and C shown in FIG. 4 represent separate stations respectively of the consolidation process. At Station A, the composite prepreg, i.e. sheets 13, has been laid up and tack-welded and has been assembled into the frame carrier 27. The frame carrier 27 provides the necessary structural support for the prepreg and vacuum bag assembly 28 to be further described in FIG. 5. It also provides a clear vacuum channel around the periphery of the assembly. Attached to the frame 27 is a vacuum connector 29 for the primary vacuum source (not shown) which will be applied to the composite sheets 13 during the entire process.

The bed 11 as shown at station B in FIG. 4 has in its top face the heated surface or platen 16 for the roller 10. The platen 16 consists preferably of 110 pitch copper on the order of, for example, 0.1875 inch thick and is divided into four equal rectangles to allow for thermal expansion differences between it and the ceramic block 20 upon which it rests (FIG. 3). A connector 30 for a secondary vacuum source (not shown) is attached to the steel box or bed 11. The secondary vacuum allows for pulling the frame and vacuum bag assembly 28 down into close contact with the heated platen 16 and with a permanent vacuum seal 31 preferably of silicone rubber which runs around the periphery of the bed 11. (Note in FIG. 3, that the permanent vacuum seal 31, is separated and thereby insulated from the heated platen 16.

The composite sheets 13 are rapidly heated to a temperature for roll consolidation, i.e. above the melting point of the matrix resin. The composite sheets 13 within the vacuum bag 12 assembly are held firmly in place during rolling by the pull-down secondary vacuum. The cooling table 26 is shown empty in Section C of FIG. 4. It, too, is provided with a connector 32 to a vacuum source (not shown) for pull-down and has a permanent seal 37 to ensure an air tight connection.

Figure 5:
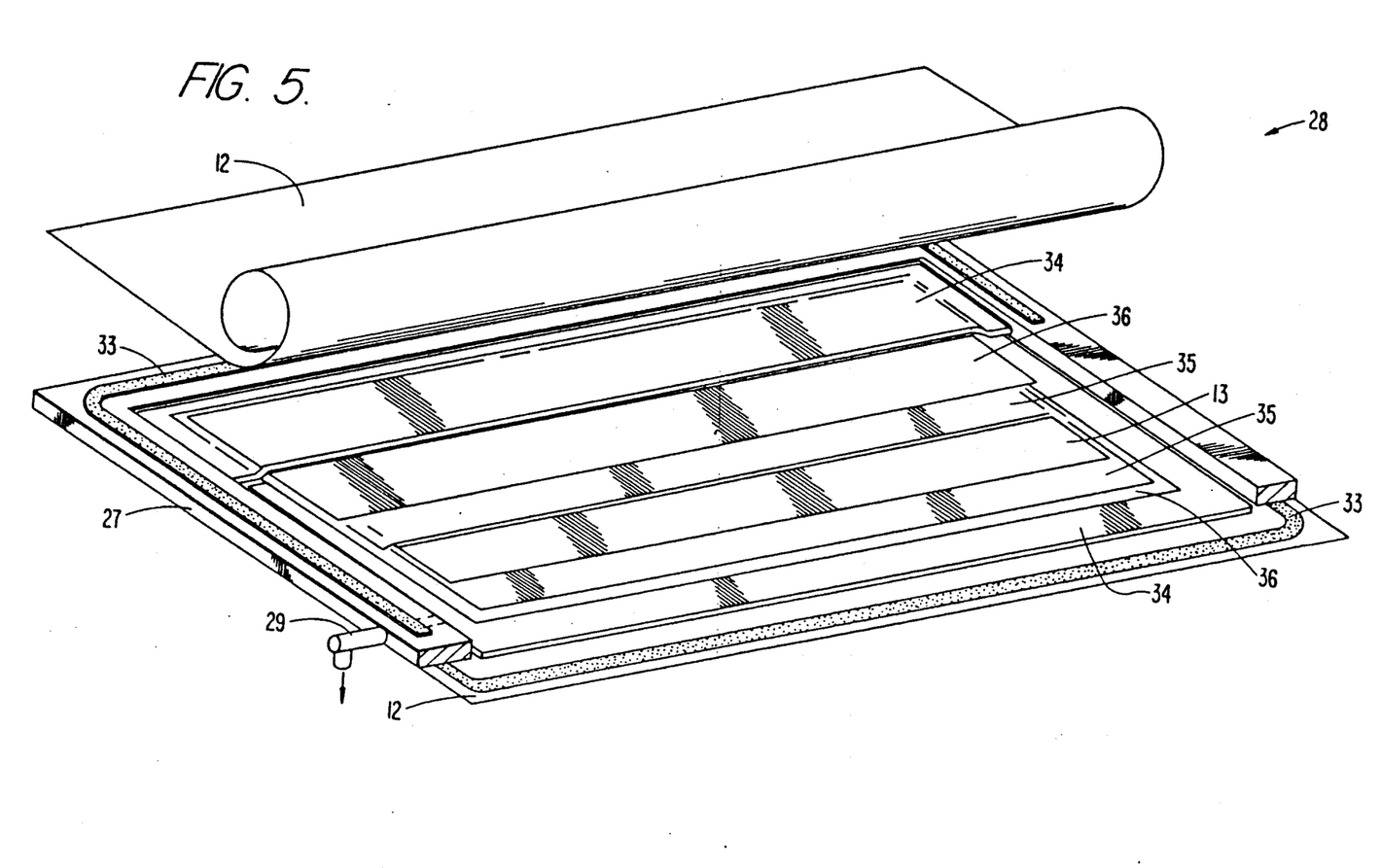
FIG. 5 is an isometric view of the frame and vacuum bag assembly with the stacked sheets therein with each element of the assembly peeled off to show the construction and arrangement thereof.

In FIG. 5 the assembly 28 is shown as it would be at the assembly station before the primary vacuum is applied. The frame carrier 27, also depicted in Section A of FIG. 4, provides a structural framework to transport the assembly 28. It also forms the peripheral frame to which the vacuum bag 12, preferably formed by a "Kapton" film sealed at and along its periphery to each side of the frame 27 by a vacuum-seal-tape 33. "Kapton" is a tradename of DuPont De Nemours, Wilmington, Del., for a polyimide material. Since the frame carrier 27 itself is insulated from the heated platen 16 of the bed 11, high-temperature vacuum sealant tape is not required. A pair of fiberglass breather cloths 34 placed between the Kapton films and inside the frame 27 maintain an open vacuum channel around the entire periphery of the assembly even after the vacuum bag 12 is pulled down tight.

At the center of the assembly 28 is the tack-welded stack of thermoplastic composite sheets or prepreg 13. Arranged symmetrically, both above and below the prepreg 13 are: first, a sheet of release film 35; then a titanium caul sheet 36. The thickness of each caul sheet 36 is preferably on the order of about 0.012 inch thick. The conventional function of caul sheets is to impart a smooth surface to the consolidated laminate prepreg or panel 13 as it resolidifies, and to prevent any wrinkles in the film of the bag 12 from being impressed into the panel 13. The upper caul sheet 36 is just thick enough to guard against wrinkles while still being thin and flexible enough to yield elastically under the roller 10 without substantially extending the footprint of the roller 10. If the footprint were extended, as would be the case with a thicker, stiffer upper caul sheet 36, the peak pressure under the roller 10 would be diminished and the pressure gradient within the footprint would be less. That pressure gradient is the driving force for the squeegee effect which drives gas ahead of the roller 10.

Above and below the caul sheets 36 is a layer of fiberglass breather cloth 34. The function of the breather layers is to provide vacuum access to the central area of the assembly 28 after the vacuum bag 12 is pulled tight. The connector 29 for the primary vacuum source is secured as by welding to the frame 27 and connects to a flexible vacuum hose so that the assembly 28 is kept under active vacuum pumping during all the steps or stages of the process.

Figure 6:
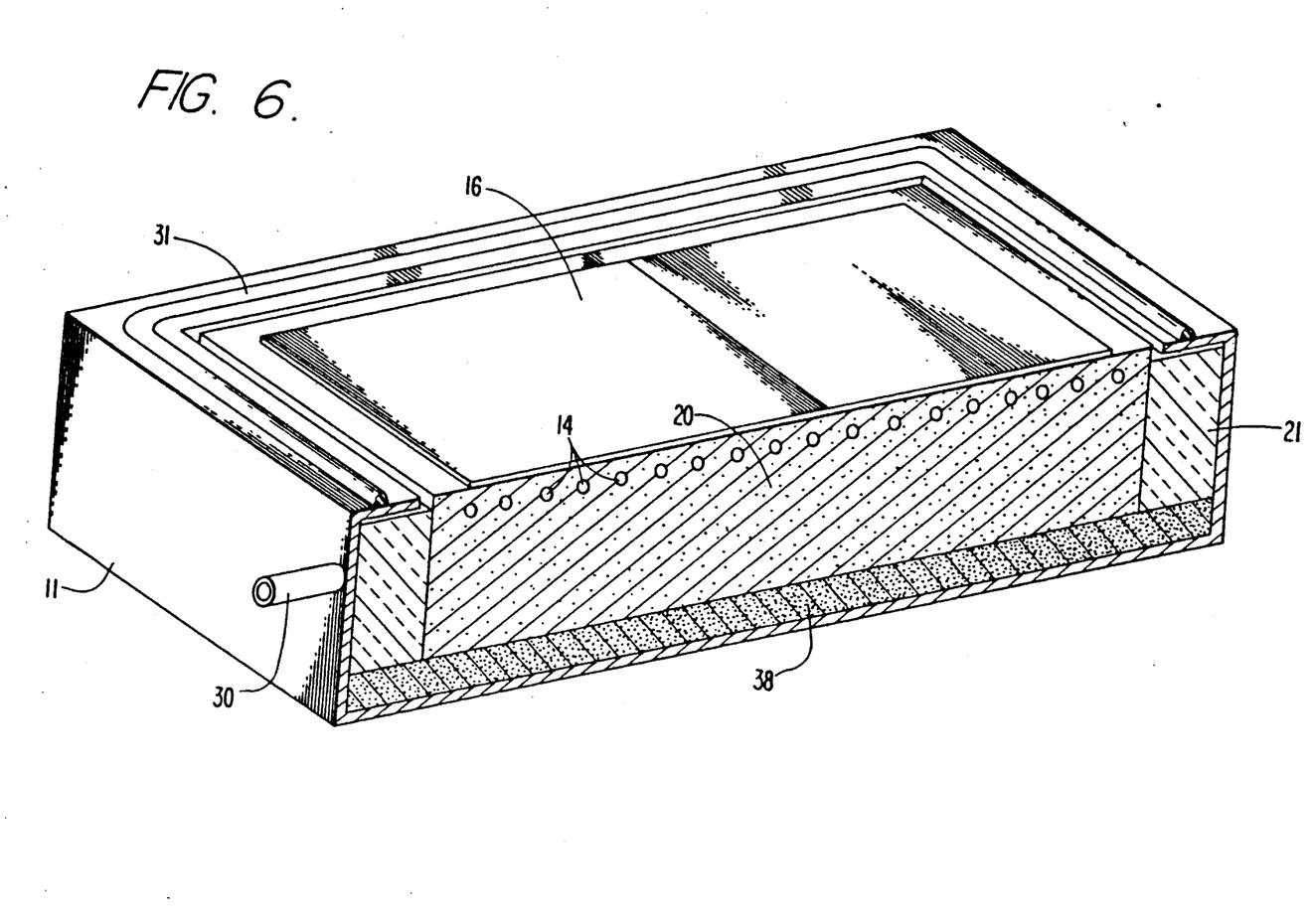
FIG. 6 is an isometric view of the heater mechanism with a cross-section taken therethrough to show the components and construction thereof.

To position the frame and vacuum assembly 28 for heating and rolling, it is placed atop the bed 11 shown in cross-section in FIG. 6. The composite sheets 13 are positioned above the preheated platen 16.

When a secondary vacuum source is applied through the connector 30, the frame and vacuum assembly 28 is pulled firmly down upon the top of the bed 11. The assembly 28, upon being pulled down, makes a vacuum-tight seal against the seal 31 which is continuous around the insulated top edge of the bed 11. The platen 16, which reacts the pressure of the roller 10, consists of a copper plate lying atop the heated ceramic block 20. The block 20 is preferably a molded fused silica product and is heated by the coils of wire 14 as hereinabove stated. As shown in FIG. 6, the sides of the bed 11 are insulated from the heated ceramic block 20 by insulation material 21. At the bottom, insulation, cushioning and levelling of the ceramic block 20 is accomplished by a bed of plaster 38. Secured as by welding into the side of the bed 11 is the vacuum connector 30 for the secondary vacuum source to pull down the frame and vacuum assembly 28 firmly onto the platen 16 during heating and rolling.

As a result of the foregoing apparatus and arrangement several productivity advantages are obtained:

1) Machine turnaround time has been reduced from several hours in an autoclave to only minutes.

2) Cooling rates on the separate cooling table 26 are fast enough to ensure optimum crystalline microstructure in the matrix resin ultimate panel 13. This is especially important for semi-crystalline resins such as PEEK that develop crystalline morphology which is dependent upon the rate of cooling from the molten state.

3) Energy consumption is reduced to a minimum. Basically only the thermoplastic panel 13 is heated and cooled. The rest of the energy consumption depends on heat losses from the bed 11.

4) Automation of this process will be straightforward and, except for the layup and package assembly operations, the subsequent steps are compatible with push-button operations.

5) A consolidation of thermoplastic composites has been demonstrated which can be scaled up to single panel sizes beyond the practicable and economical size limits of platen presses and autoclaves.

6) For any given panel size and volume capacity, both acquisition and recurring operational cost advantages have been projected vis-a-vis either platen presses or autoclaves.

While the foregoing has presented full and complete instructions for constructing the preferred embodiment of the present invention, it will be appreciated by those skilled in the art that other similar arrangements may be made to construct embodiments of the present invention in the light of the teachings of this specification. Therefore, the scope of the present invention is to be limited only by the claims below.

What is claimed is:

1. An apparatus for consolidating sheets of continuous graphite fiber in a thermoplastic matrix resin comprising:
 a rigid relatively flat surface;
 a vacuum bag designed and adapted to contain a stack of such sheets to be consolidated disposed on said surface;

a connector to said vacuum bag to operatively attach a vacuum source for removal of air from said bag;

a (massive) roller mounted above said surface capable of applying rolling pressure on and over said vacuum bag thereby compressing said stack of sheets within said bag on and against said surface said rolling pressure being sufficient to consolidate said stack of sheets;

and temperature regulating means including a ceramic block containing electrically heated wires and a thermocouple and a copper plate atop said ceramic block to (uniformly) adjust the temperature (throughout) of said stack of sheets whereby they are fused into a composite upon operation of said roller with said connector operatively attached (as aforesaid).

2. The apparatus of claim 1 wherein said roller is carried by a gantry mounted on fixed tracks relative to said surface to facilitate movement of said roller along the length of said surface and to augment said roller in compressing said stack of sheets.

3. The apparatus of claim 1 including a motor and a connection between said motor and said roller.

4. The apparatus of claim 3 wherein said connection includes a roller link chain and an unpowered gear end station.

5. The apparatus of claim 1 including a frame carrier to support said stack of sheets and thereby facilitate handling and movement thereof relative to said vacuum bag and said surface.

6. The apparatus of claim 5 wherein said frame carrier includes a connector communicating with the interior thereof and adapted to receive pressure from a vacuum source whereby vacuum pressure is applied to said stack of sheets when disposed within said bag.

7. The apparatus of claim 5 wherein said flat surface is mounted on a stationary bed and includes a connector communicating with the interior thereof adapted to receive pressure from a vacuum source whereby vacuum pressure is applied to said frame carrier when disposed in said bag and said bag disposed on said surface.

8. The apparatus of claim 5 further including a table adapted to receive and support said frame carrier with said stack of sheets thereon when disposed within said bag and a connector communicating with the interior of said table and adapted to receive a vacuum source whereby vacuum pressure is applied to said frame carrier thereon.

9. The apparatus of claim 5 including a pair of fiberglass breather cloths within said bag and said frame carrier when disposed in said bag, a pair of titanium caul sheets between said breather cloths and a pair of release films between said caul sheets adapted to be disposed on opposite sides of said stack of sheets when disposed in said frame carrier.

* * * * *